(12) United States Patent
Balzeau

(10) Patent No.: US 7,721,922 B2
(45) Date of Patent: May 25, 2010

(54) RECEPTACLE

(75) Inventor: Pascal Balzeau, Chevilly Larue (FR)

(73) Assignee: L'Oreal (FR)

( * ) Notice: Subject to any disclaimer, the term of this patent is extended or adjusted under 35 U.S.C. 154(b) by 1248 days.

(21) Appl. No.: 10/653,636

(22) Filed: Sep. 2, 2003

(65) Prior Publication Data

US 2004/0079769 A1 Apr. 29, 2004

Related U.S. Application Data

(60) Provisional application No. 60/411,755, filed on Sep. 19, 2002, provisional application No. 60/412,782, filed on Sep. 24, 2002.

(30) Foreign Application Priority Data

Aug. 30, 2002 (FR) .................................. 02 10806
Aug. 30, 2002 (FR) .................................. 02 10807

(51) Int. Cl.
B67D 3/00 (2006.01)
B65D 23/00 (2006.01)
B65D 43/08 (2006.01)

(52) U.S. Cl. ...................... 222/540; 215/383; 220/796; 220/661

(58) Field of Classification Search ................ 222/540, 222/143; 220/256, 661, 796; 215/364, 383
See application file for complete search history.

(56) References Cited

U.S. PATENT DOCUMENTS

| 2,537,226 | A | * | 1/1951 | Lindsey ...................... 239/337 |
| 4,768,688 | A | | 9/1988 | Harrigan |
| 5,918,777 | A | * | 7/1999 | Flak ........................... 222/212 |
| 6,227,392 | B1 | | 5/2001 | Balzeau |
| 6,290,094 | B1 | | 9/2001 | Arnold et al. |
| 6,659,314 | B2 | * | 12/2003 | Garcia ........................ 222/540 |

FOREIGN PATENT DOCUMENTS

| FR | 370650 | 2/1907 |
| FR | 685063 | 7/1930 |
| FR | 697421 | 1/1931 |
| FR | 2688431 | 9/1993 |
| GB | 595638 | 12/1947 |

* cited by examiner

*Primary Examiner*—Kevin P Shaver
*Assistant Examiner*—Melvin A Cartagena
(74) *Attorney, Agent, or Firm*—Lerner, David, Littenberg, Krumholz & Mentlik, LLP

(57) ABSTRACT

The present invention includes a receptacle for a cosmetic or care product although other substances may be used in conjunction with the present application. The receptacle includes a body with a single opening. An insert is secured in the opening and includes a passage for extracting the cosmetic or care product.

43 Claims, 5 Drawing Sheets

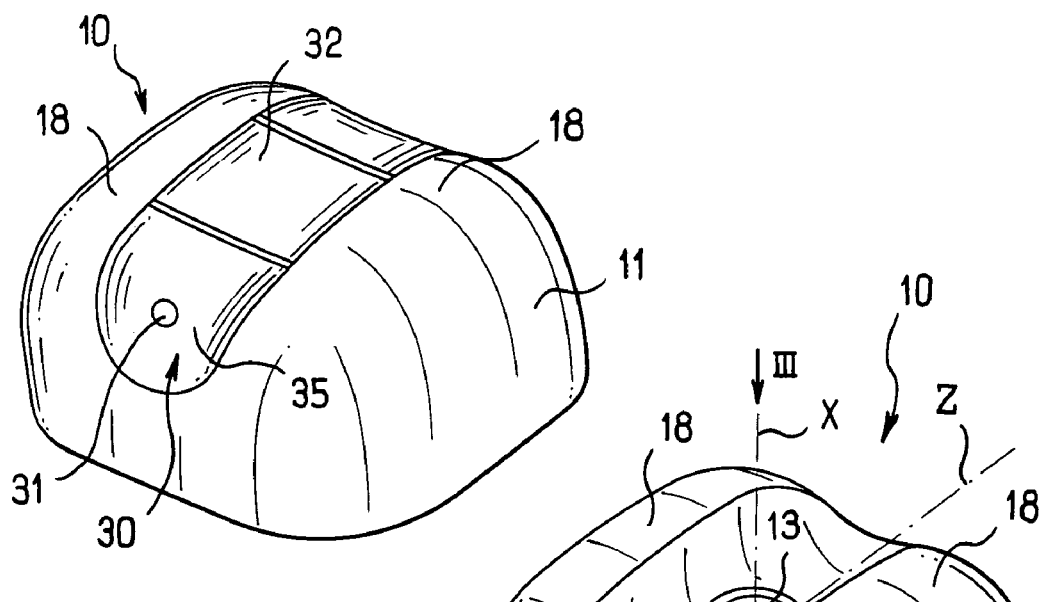
FIG_1
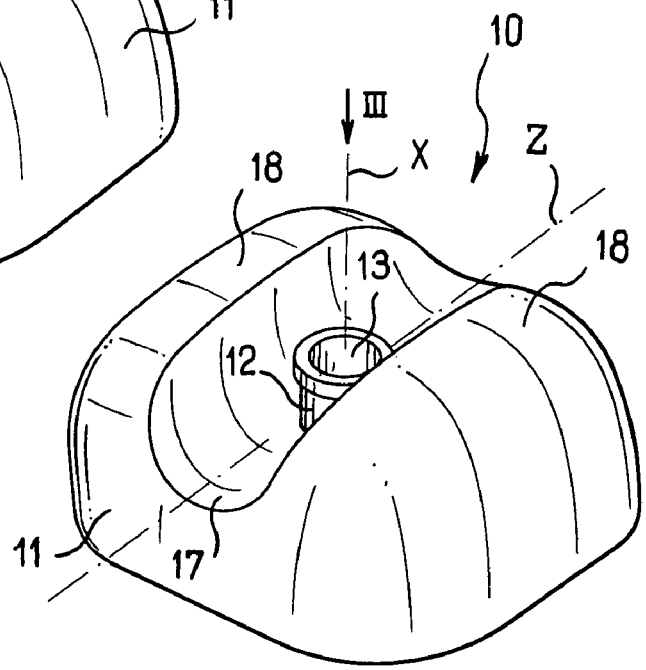
FIG_2
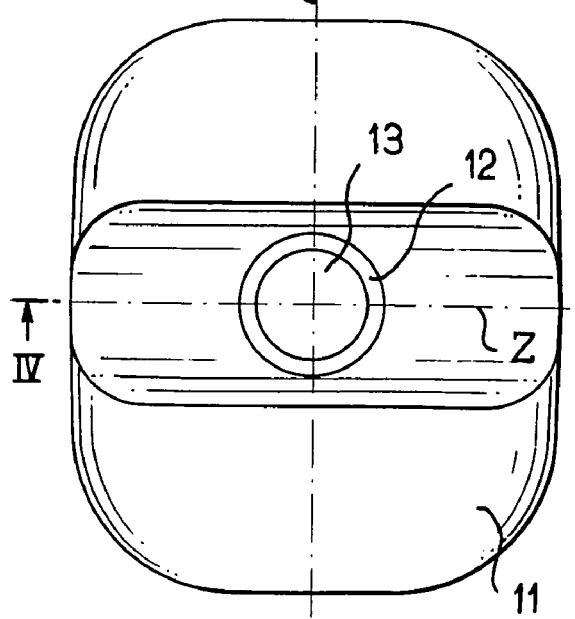
FIG_3
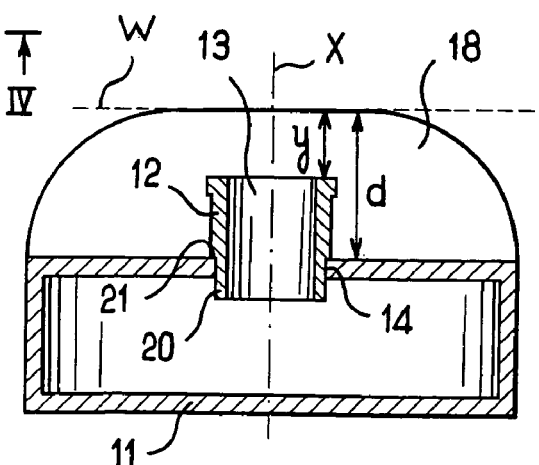
FIG_4

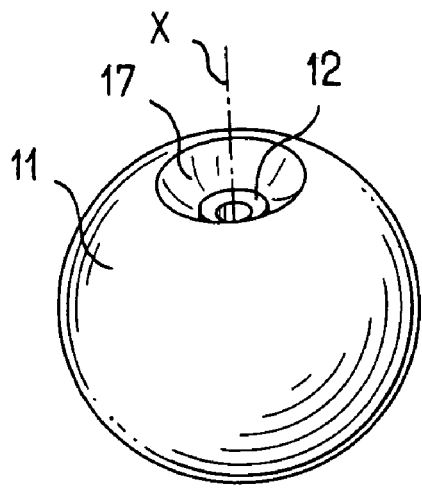
FIG_9
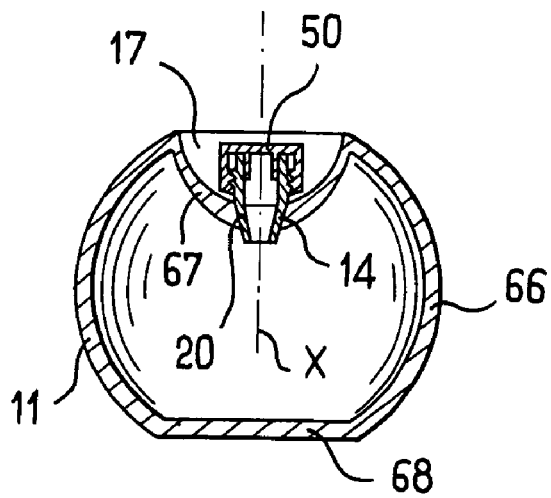
FIG_10
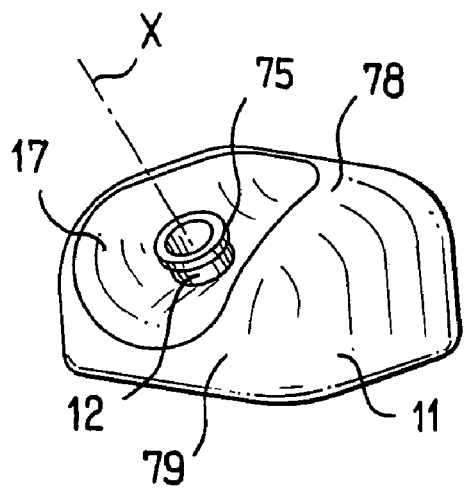
FIG_11
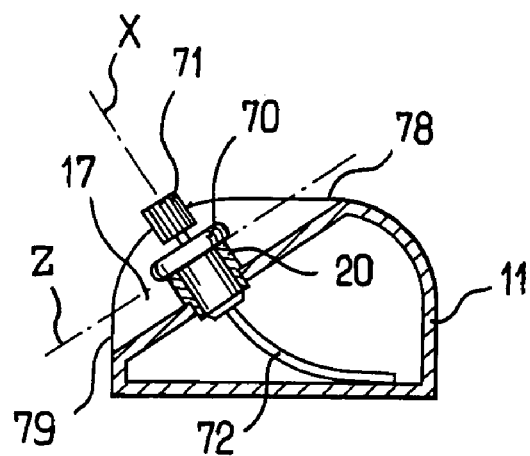
FIG_12

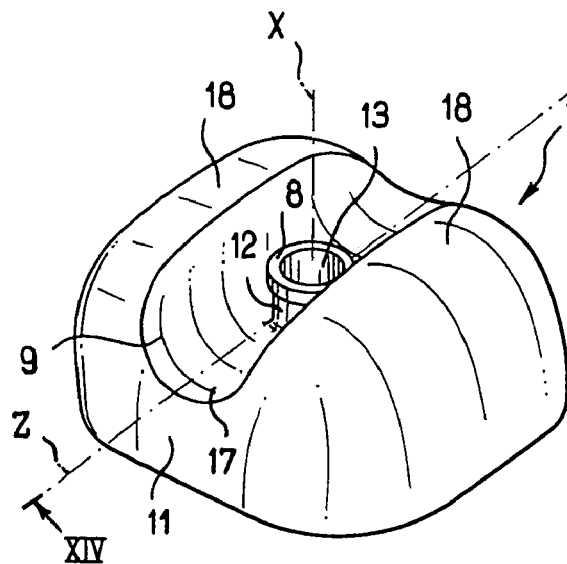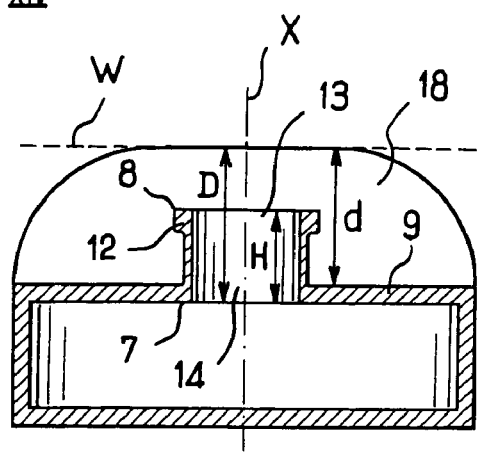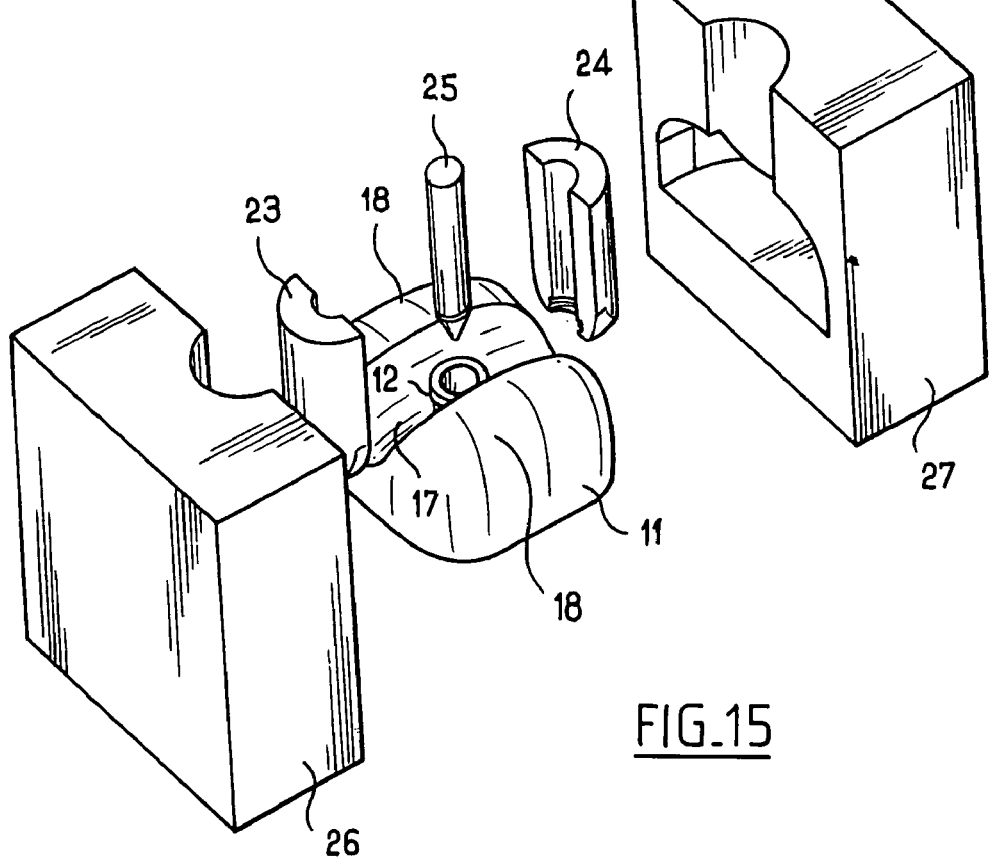

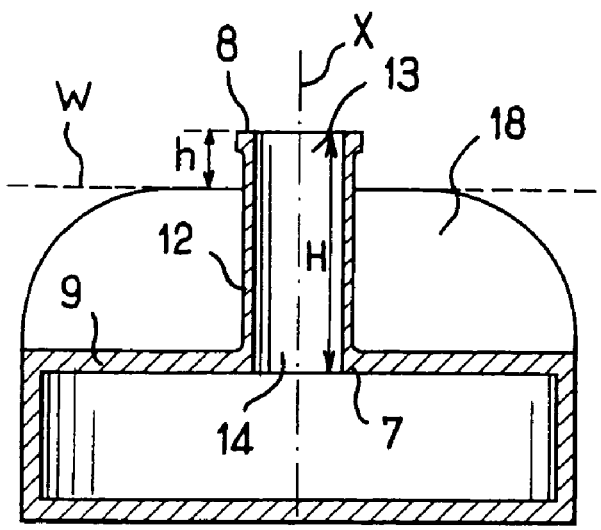
FIG_16
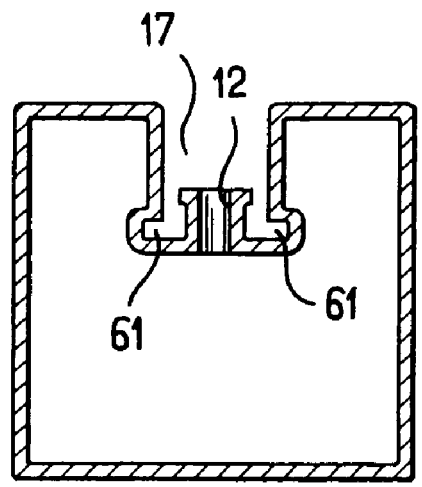
FIG_17
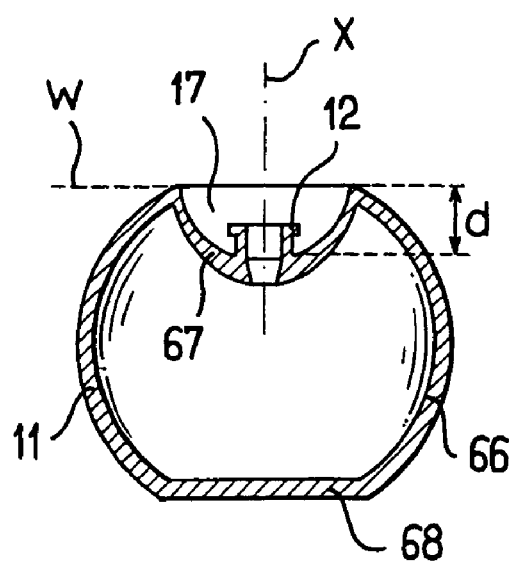
FIG_18
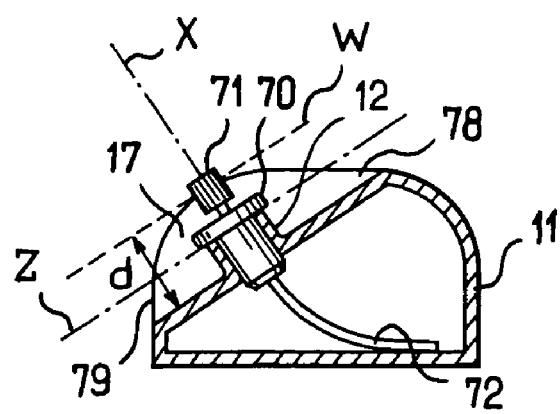
FIG_19

RECEPTACLE

CROSS-REFERENCE TO RELATED APPLICATIONS

This application claims the benefit of U.S. Provisional Application No. 60/411,755 filed on Sep. 19, 2002 and U.S. Provisional Application No. 60/412,782 filed on Sep. 24, 2002, the disclosures of which are incorporated by reference herein.

BACKGROUND OF THE INVENTION

The present invention relates to receptacles, and in particular those for containing a cosmetic or care product.

The term "cosmetic" is used in the present specification to designate a product as defined in EEC Directive 93/35 of Jun. 14, 1993 amending EEC Directive 76/768.

There exists a need for receptacles that are easily carried about, for example in a handbag, while offering capacity that complies with consumer requirements.

In one of its aspects, the present invention seeks to satisfy this need.

SUMMARY OF THE INVENTION

The invention achieves these goals by means of a receptacle having a body provided with at least one opening. An insert is secured in the opening and includes a passage for extracting a substance contained in the receptacle. A closure and/or dispenser member may be mounted on the insert. The receptacle is further characterized by the fact that the body of the receptacle includes a setback in which the opening is situated. Additionally, the closure and/or dispenser member may extend at least in part around the insert in the setback. The insert may form the neck of the receptacle.

The receptacle body may be made from a plastic, glass, ceramic material or the like.

The invention makes it possible to reduce the overall size of the receptacle as measured along the axis of its neck. This is in comparison with known prior art receptacles. In addition, in terms of appearance, the present invention broadens the options for making shapes that are original.

In additional embodiments of the present invention, the receptacle may include a receptacle body made of glass or ceramic, provided with at least one opening, and in particular a single opening. An insert is secured in the opening and includes a passage for extracting a substance contained in the body of the receptacle. The receptacle being further characterized by the fact that the opening is situated in a setback in the body of the receptacle.

In yet another embodiment of the present invention, the invention may include a receptacle having a body. The body includes a bottom portion, which the receptacle may stand and support itself. An opening may be included in the top portion of the receptacle. An insert is secured in the opening and has a passage for extracting a substance contained in the receptacle. A closure and/or dispenser member is mounted on the insert. The receptacle further characterized by the fact that the receptacle body includes a setback in which the opening is situated. The closure and/or dispenser member extends at least in part around the insert in the setback.

In each variant of the present invention, the insert and the receptacle body may be made of different materials. By way of example, the insert may be made of a thermoplastic material, in particular a polypropylene, polyethylene, polyethylene, terephthalate material or the like.

The insert may be attached in various ways in the opening, depending on the nature of the materials constituting the insert and the body of the receptacle. The method of attaching the insert may further depend on the nature of the substance contained in the receptacle.

The insert may include a shoulder configured to abut against an edge of the opening. The height of the neck may be greater than or less than the depth of the setback. In order to further reduce the overall size of the receptacle and improve its appearance, it may be desirable for the height of the neck to be less than the depth of the setback, in particular when a dispenser member is mounted on the neck.

The receptacle may include a closure member configured to close the receptacle in leak tight manner, such as a cap. Such a closure member may be connected in various ways to the neck, for example by screw fastening, where the neck includes an outside thread.

The receptacle may also include a dispenser member such as a pump or a valve.

In an additional embodiment of the present invention, the setback extends along a longitudinal axis which extends transversely to the axis of the neck, for example perpendicularly to the axis of the neck. The setback may present a cylindrical surface having its generator lines substantially perpendicular to the axis of the neck. The setback may also present a surface that is not cylindrical, in particular when the setback is in the form of a cup. The depth of the setback may be greater than 2 millimeters (mm), or indeed greater than 5 mm or even 10 mm.

The receptacle may contain a substance in the form of a cosmetic or a care product.

Additional features that may be included with the present invention is a method of manufacturing a receptacle. The method being characterized in that it includes the following steps. First, making a receptacle body with a setback and an opening situated in the setback. Second, connecting an insert to form the neck of the receptacle in the opening. The receptacle body may be made of glass, ceramic or the like, by blow-molding.

The present invention also provides, independently of or in combination with the above, a receptacle having a glass or ceramic body presenting a setback.

A neck is provided along an axis X extending between a first end and a second end. The neck may be axially situated and level with a wall defining the setback. The neck may extend over substantially its entire height inside the setback. The neck and the body may be made as a single piece. The term "substantially its entire height" is used to mean at least 50% of its height, preferably 75%, and more preferably 90%. The neck may also extend entirely inside the setback.

The neck may extend from the bottom of the setback. In a variant, the neck may extend from a region of the setback that does not correspond to the bottom of the setback.

In an additional embodiment of the present invention, the setback extends along an axis that extends transversely to the axis of the neck, for example perpendicularly to the axis of the neck. The setback may present a cylindrical surface having generator lines that are substantially perpendicular to the axis of the neck, with a director line that is optionally circular. Such a configuration of the setback makes the neck easier to unmold when making the receptacle by blow-molding.

The setback may also present a surface that is not cylindrical, in particular when the setback is in the form of a cup. The depth of the setback in the receptacle may be greater than 2 mm, or indeed even greater than 5 mm, or 10 mm.

The receptacle may contain a cosmetic or a care product.

The receptacle may include a closure member configured to close the receptacle in a leak tight manner, such as a cap. Such a closure member may be attached to the neck in various ways, for example by screw fastening. In this instance, the neck may then include an outside thread.

The receptacle may also include a dispenser member such as a pump or a valve. The closure or dispenser member may extend over the setback. Nevertheless, in order to reduce the overall size and improve the appearance of the receptacle, it may be desirable for the closure or dispenser member to extend entirely inside the setback.

Another feature of the present invention provides a method of manufacturing a receptacle out of glass, ceramic, or the like. The method includes the following steps. First, making a preform with a mold comprised of two parts configured to form the neck of the receptacle. Second, blow-molding the preform to form the body of the receptacle. The body including a setback configured to enable the neck to be unmolded by moving apart the two above-mentioned mold parts.

BRIEF DESCRIPTION OF THE DRAWINGS

The invention will be better understood on reading the following detailed description of non-limiting embodiments of the invention and on examining the accompanying drawings, in which:

FIG. 1 is a front, perspective view of a receptacle constituting a first embodiment of the present invention;

FIG. 2 is a front, perspective view of the embodiment of FIG. 1 after removing the dispenser member mounted on the neck;

FIG. 3 is a top, elevational view of the receptacle shown in FIG. 2;

FIG. 4 is a side, elevational, cross-sectional view of the receptacle shown in FIG. 1;

FIG. 9 is a front, perspective view of another embodiment of the receptacle of the present invention;

FIG. 10 is a side, elevational, cross-sectional view of the receptacles of FIG. 9;

FIG. 11 is a front, perspective view of another embodiment of the receptacle of the present invention;

FIG. 12 is a side, elevational, cross-sectional view of the receptacles of FIG. 9 and FIG. 11;

FIG. 13 is a front, perspective view of another embodiment of the receptacle of FIG. 2;

FIG. 14 is a side, elevational, cross-sectional view of the receptacle of FIG. 13;

FIG. 15 is a side, perspective, exploded view showing the receptacle of FIG. 13 together with mold elements used in making it;

FIG. 16 is a side, elevational, cross-sectional side view of another embodiment of the receptacle of FIG. 13;

FIG. 17 is a die, elevational, cross-sectional view of another embodiment of the receptacle of FIG. 8;

FIG. 18 is a die, elevational, cross-sectional view of another embodiment of the receptacle of FIG. 10;

FIG. 19 is a cross-sectional view showing respective variants of the receptacles of FIG. 12.

DETAILED DESCRIPTION

Figure 5:
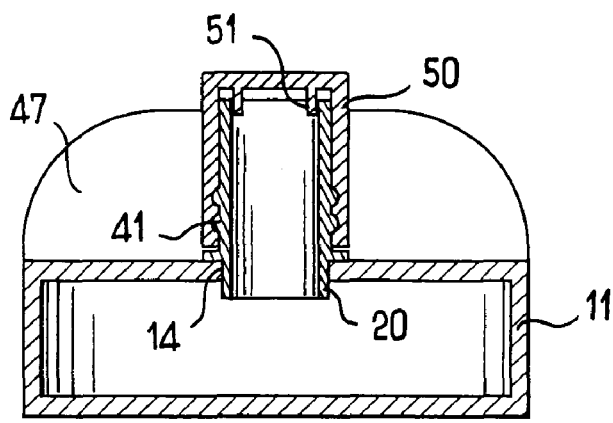
FIG. 5 is a side, elevational cross-sectional view of another embodiment of the receptacle shown in FIG. 2, fitted with a closure member.

FIGS. 1 to 4 show a receptacle 10 having a body 11 and a neck 12. The neck 12 is provided with a passage 13 for delivering the substance contained in the body 11, e.g. a perfume.

The body 11 may be made as a single molded piece. For example, a molding of an inorganic material such as crystal, or quartz glass, or the like may be employed. Other materials could also be used for making the body 11, such as, porcelain, earthenware, or indeed organic material, e.g. a thermoplastic material. The body 11 is provided with an opening 14 which may be circular.

The body 11 is also made with a setback 17 which extends between two raised portions 18 of the body 11. Each of the two raised portions are capable of containing a substance.

In the example described, the opening 14 is situated in the bottom of the setback 17. The center of the opening 14 being situated in a midplane M of the receptacle. The midplane M being perpendicular to the longitudinal axis Z of the setback 17. The setback 17 presents a surface which is cylindrical having a generator line parallel to the axis Z, and a director line that is circular or otherwise. The depth d of the setback 17 as measured between the bottom thereof and a plane W perpendicular to the axis X and tangential to the body 11 may be, for example, greater than or equal to 10 mm. The distance y between the free end of the neck 12 and the plane W, still measured along the axis X may be greater than or equal to 5 mm.

The neck 12 may be formed by an insert 20 which is fixed in the opening 14. The insert 20 may be made of the same material as the body 11 of the receptacle, or in a variant it may be made of a different material. Specifically, the insert 20 may be made of a plastic material, while the body 11 of the receptacle is made of glass or of ceramic.

In the example described, the insert 20 has a shoulder 21 which bears against the wall of the body 11 around the opening 14. The insert 20 may be secured to the body 11 in various ways, including a force-fit, by adhesive, by heat sealing, or the like. The method of securing the insert optionally being selected as a function of the nature of the substance with which the receptacle is to be filled.

A dispenser member 30 may be fitted in the setback 17 and fixed on the neck 12, as can be seen in FIG. 1. The dispenser member 30 may include a cover 35 provided with a dispenser orifice 31 and a pushbutton 32. The pushbutton 32 being movable relative to the cover 35, in order to actuate a mechanism that is not visible, such as a pump mechanism. Each time the pushbutton 32 is pressed down, the substance contained within the receptacle may be expelled through the dispenser orifice 31.

It is also possible to secure an insert 20 in the opening 14 of the body 11 of the receptacle where the insert 20 is of sufficient length to cause the neck to project out from the insert 17, as shown in FIG. 5.

The insert 20 may include an outside thread 41 making it possible, for example, to screw on a closure member 50, such as a cap. As shown, the cap may include a sealing lip 51 that is configured to bear against the inside surface of the neck.

Naturally, the body of the receptacle can be made having still further shapes without going beyond the ambit of the present invention.

Figure 6:
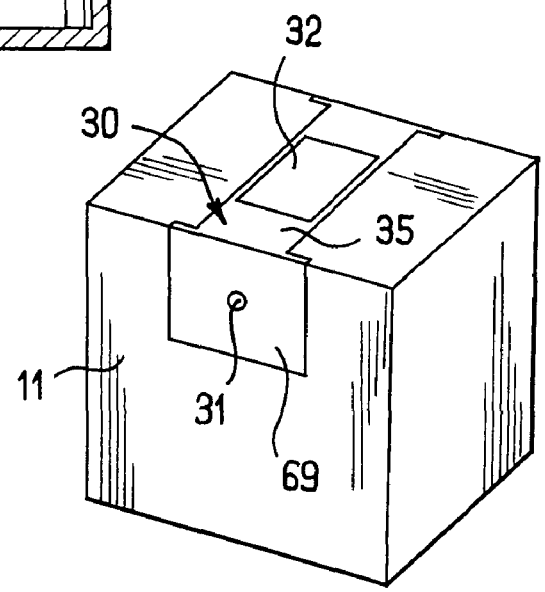
FIG. 6 is a front, perspective view of another embodiment of a receptacle in accordance with the present invention.
Figure 7:
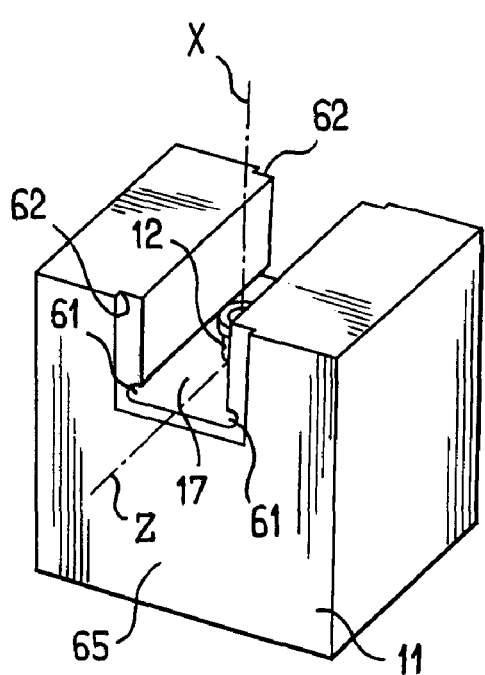
FIG. 7 is a front, perspective view of the receptacle shown in FIG. 6, after removing the dispenser member.
Figure 8:
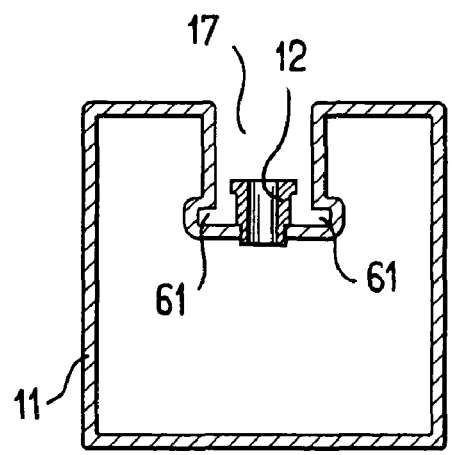
FIG. 8 is a front, elevational, cross-sectional view of the receptacle of FIG. 7.

For example, FIGS. 6 to 8 show a receptacle whose overall shape is generally that of a cube. As can be seen in FIGS. 7 and 8, the body 11 of the receptacle has a setback 17 whose section in a plane perpendicular to its longitudinal axis Z is generally rectangular. Two opposite longitudinal grooves 61 may be formed in the bottom of the setback 17.

On examining FIG. 7, it can be seen that the body 11 presents steps 62 in each of its faces 65 into which the setback 17 opens out longitudinally. The depth of the steps 62 corresponds to the thickness of a wall 69 of the cover 35. The grooves 61 serve to engage, by snap-fastening, fixing tabs (not shown) of the dispenser member 30.

The body 11 of the receptacle shown in FIGS. 9 and 10 has a flat bottom 68 extending upwards by a side wall 66 that is in the form of a portion of a sphere that is truncated on top.

In this embodiment, the setback 17 is generally in the form of a cup, being defined by an upwardly concave wall 67 and provided in its bottom with an opening 14. Opening 14 receives a threaded insert 20 that is to constitute the neck of the receptacle and onto which a closure member 50 may be screwed.

In the embodiment of FIGS. 9 and 10, the height of the neck 12 may be less than the depth of the setback 17.

In all of the embodiments described above, the axis X of the neck 12 is vertical when the receptacle is standing on a horizontal plane surface. Nevertheless, a different configuration is possible without going beyond the ambit of the present invention.

By way of example, FIGS. 11 and 12 show a receptacle having a setback 17 whose bottom extends parallel to a longitudinal axis Z which is not horizontal and which is perpendicular to the axis X of the neck 12. The setback 17 may extend at one end to the top face 78 of the body 11 of the receptacle and at its opposite end to the front face 79 thereof.

The neck 12 may have an annular bead 75 serving to secure a valve or a pump 70. The valve or pump may include a pushbutton 71 provided with a dispenser orifice (not shown) and a dip tube 72.

In the embodiments of FIGS. 1 to 12, the neck of the receptacle is constituted by a separate insert that is secured in the opening 14. This configuration may be changed without going beyond the ambit of the present invention. In particular, as shown in FIGS. 13 and 14, the neck 12 and the body 11 of the receptacle can be made as a single piece. A wall 9 of the body 11 defines the setback 17. The neck 12 extends along an axis X that is vertical in the example described, between a first end 17, and a free second end 8. The first end 17 is level with the wall 9.

In the example described, the neck 12 extends from the bottom of the setback 17, the center of the opening 14 being situated in a midplane M of the receptacle. The midplane M being perpendicular to the axis of another region of the wall 9 of the setback. The setback 17 presents a surface that is cylindrical, having generator lines parallel to the axis Z. The distance D between the wall 9 and the plane W, which is perpendicular to the axis X and tangential to the body 11, as measured along the axis X, may be greater than or equal to 5 mm. The height H of the neck measured along the axis X between the ends 7 and 8 of the neck may be less than 5 mm, for example. In this embodiment, the neck 12 extends entirely inside the setback.

In order to make the receptacle of FIGS. 13 and 14, it is possible to begin, as shown in FIG. 15, by forming a preform using a ring mold. The ring mold may include two parts 23 and 24 which are assembled together to make the neck 12 of the receptacle. This mold also has a punch 25 configured to form the passage 13 through the neck 12. The preform is then transferred to a finishing mold. The finishing mold having two parts 26 and 27, into which it is blow-molded so as to form the body 11 of the receptacle. The neck 12 is unmolded by separating the parts 23 and 24 of the ring mold. The presence of the setback 17 allows the parts 23 and 24 to be moved apart.

The neck 12 made integrally with the body 11 may, in a variant as shown in FIG. 16, extend above the setback 17 by a height h measured along the axis X between the plane W and the free end 8 of the neck. The total height of the neck as measured between the ends 7 and 8 of the neck 12 along the axis x is depicted as H in the figure. The ratio h/H is less than or equal to 0.5, which means at least 50% of height of the neck 12 extends inside the setback.

The receptacles of FIGS. 8, 10, and 12 include respective inserts 20 fixed in the opening 14 of the body 11.

FIGS. 17, 18, and 19 show receptacles corresponding respectively to those of FIGS. 8, 10, and 12. Each having a neck 12 that is made integrally with the body 11 of the receptacle as contrasted with having an insert. These receptacles may be made using the method of manufacture illustrated by FIG. 15.

The present invention is not limited to the embodiments described above. In particular, the body of the receptacle may present shapes other than those described without going beyond the ambit of the present invention. Additionally, the setback or the insert placed in the opening of the receptacle may be configured with various shapes. Where appropriate, the insert may be made integrally with an element of a dispenser mechanism. Also, the closure and/or dispenser members may present shapes other than those shown.

Throughout the description, including in the claims, the term "comprising a" should be understood as being synonymous with "comprising at least one" unless specified to the contrary.

The invention claimed is:

1. A receptacle, comprising:
    a receptacle body defining an enclosed chamber having a single opening, said receptacle body including a setback, said opening being disposed in said setback;
    an insert disposed in said opening and extending in a length direction below said opening into said enclosed chamber, said insert having an outer periphery projecting above said opening and a passage for extracting a substance from said enclosed chamber; and
    a closure member mounted on said insert outward of said outer periphery so that said closure member overlies at least a portion of said insert in said length direction.

2. A receptacle according to claim 1, wherein said receptacle body comprises a plastic material.

3. A receptacle according to claim 1, wherein said receptacle body comprises a material selected from the group consisting of glass and ceramic.

4. A receptacle according to claim 1, wherein said insert and said receptacle body comprise different materials.

5. A receptacle according to claim 1, wherein said insert comprises a thermoplastic material selected from the group consisting of polypropylene, polyethylene, and polyethylene terephthalate.

6. A receptacle according to claim 1, wherein said insert is secured in said opening by friction.

7. A receptacle according to claim 1, wherein said single opening has an edge and said insert includes a shoulder configured to abut said edge of said opening.

8. A receptacle according to claim 1, wherein said insert defines a neck, said neck having a height greater than a depth of said setback.

9. A receptacle according to claim 1, wherein said outer periphery of said insert defines a neck having a height that is less than or equal to a depth of said setback.

10. A receptacle according to claim 1, wherein said closure member is configured to close said passage in said insert in a leak tight manner.

11. A receptacle according to claim 1, wherein said insert includes an outside thread.

12. A receptacle according to claim 1, wherein said insert includes an axis and said setback includes a longitudinal axis extending transversely to said axis of said insert, said setback extending along said longitudinal axis.

13. A receptacle according to claim 12, wherein said setback presents a cylindrical surface, said cylindrical surface having a plurality of generator lines substantially perpendicular to said axis of said insert.

14. A receptacle according to claim 1, wherein said setback presents a surface that is not cylindrical.

15. A receptacle according to claim 14, wherein said setback is in the shape of a cup.

16. A receptacle according to claim 1, wherein said setback has a depth greater than 2 mm.

17. A receptacle according to claim 16, wherein said setback has a depth greater than 10 mm.

18. A receptacle according to claim 1, wherein said enclosed chamber contains a substance selected from the group consisting of a cosmetic and a care product.

19. A receptacle, comprising:
   a receptacle body defining an enclosed chamber having a single opening, said receptacle body including a setback, said opening being disposed in said setback;
   an insert disposed in said opening and extending in a length direction below said opening into said enclosed chamber, said insert having an outer periphery projecting above said opening and a passage for extracting a substance from said enclosed chamber; and
   a dispenser member mounted on said insert outward of said outer periphery so that said dispenser member overlies at least a portion of said insert in said length direction.

20. A receptacle according to claim 19, wherein said dispenser member is selected from the group consisting of a pump and a valve.

21. A receptacle according to claim 19, wherein said receptacle body comprises a plastic material.

22. A receptacle according to claim 19, wherein said receptacle body comprises a material selected from the group consisting of glass and ceramic.

23. A receptacle according to claim 19, wherein said insert and said receptacle body comprise different materials.

24. A receptacle according to claim 19, wherein said insert comprises a thermoplastic material selected from the group consisting of polypropylene, polyethylene, and polyethylene terephthalate.

25. A receptacle according to claim 19, wherein said insert is secured in said opening by friction.

26. A receptacle according to claim 19, wherein said opening has an edge and said insert includes a shoulder configured to abut said edge of said opening.

27. A receptacle according to claim 19, wherein said insert defines a neck, said neck having a height greater than a depth of said setback.

28. A receptacle according to claim 19, wherein said outer periphery of said insert defines a neck having a height that is less than or equal to a depth of said setback.

29. A receptacle according to claim 19, further comprising a closure member configured to close said passage in said insert in a leak tight manner.

30. A receptacle according to claim 19, wherein said insert includes an outside thread.

31. A receptacle according to claim 19, wherein said insert includes an axis and said setback includes a longitudinal axis extending transversely to said axis of said insert, said setback extending along said longitudinal axis.

32. A receptacle according to claim 19, wherein said setback presents a cylindrical surface, said cylindrical surface having generator lines substantially perpendicular to said axis of said insert.

33. A receptacle according to claim 19, wherein said setback presents a surface that is not cylindrical.

34. A receptacle according to claim 19, wherein said setback is in the shape of a cup.

35. A receptacle according to claim 19, wherein said setback has a depth greater than 2 mm.

36. A receptacle according to claim 19, wherein said setback has a depth greater than 10 mm.

37. A receptacle according to claim 19, wherein said enclosed chamber contains a substance selected from the group consisting of a cosmetic and a care product.

38. A receptacle, comprising: a receptacle body formed from a material selected from the group consisting of glass and ceramic, said receptacle body defining an enclosed chamber having a single opening, said receptacle body including a setback in the shape of a cup, said opening being disposed in said setback; and
   an insert disposed in said opening and having a passage for extracting a substance from said receptacle body.

39. A receptacle, comprising:
   a receptacle body including a bottom portion on which said receptacle body can stand and a top portion having a wall, said receptacle body defining an enclosed chamber, said wall including a setback and an opening to said enclosed chamber disposed in said setback;
   an insert disposed in said opening and extending in a length direction below said opening into said enclosed chamber, said insert having an outer periphery projecting above said opening and a passage for extracting a substance from said enclosed chamber; and
   a closure member mounted on said insert outward of said outer periphery so that said closure member overlies at least a portion of said insert in said length direction.

40. A receptacle according to claim 39, wherein said closure member is configured to close said receptacle in a leak tight manner.

41. A receptacle according to claim 39, wherein said insert includes an outside thread.

42. A receptacle, comprising:
   a receptacle body including a bottom portion on which said receptacle body can stand and a top portion having a wall said receptacle body defining an enclosed chamber, said wall including a setback and an opening to said enclosed chamber disposed in said setback;
   an insert disposed in said opening and extending in a length direction below said opening into said enclosed chamber, said insert having an outer periphery projecting above said opening and a passage for extracting a substance from said enclosed chamber; and
   a dispenser member mounted on said insert outward of said outer periphery so that said dispenser member overlies at least a portion of said insert in said length direction.

43. A receptacle according to claim 42, wherein said dispenser member is selected from the group comprising a pump and a valve.

* * * * *

UNITED STATES PATENT AND TRADEMARK OFFICE
CERTIFICATE OF CORRECTION

PATENT NO.       : 7,721,922 B2                                      Page 1 of 1
APPLICATION NO.  : 10/653636
DATED            : May 25, 2010
INVENTOR(S)      : Balzeau It is certified that error appears in the above-identified patent and that said Letters Patent is hereby corrected as shown below:

Column 1, line 49, "being" should read --is--.
Column 1, line 54, after "portion," insert --by--.
Column 1, line 59, after "receptacle" insert --is--.
Column 2, line 14, "leak tight" should read --leak-tight--.
Column 3, line 64, "die," should read --side--.
Column 3, line 66, "die," should read --side--.
Column 4, line 19, "are" should read --is--.
Column 4, line 21, "being" should read --is--.
Column 4, line 23, "being" should read --is--.
Column 4, line 49, "being" should read --is--.
Column 4, line 57, "insert" should read --setback--.
Column 5, line 50, "being" should read --is--.
Column 5, line 66, "having" should read --has--.
Column 6, line 10, after "of", first occurrence, insert --the--.
Column 6, line 15, "having" should read --has--.
Column 8, line 50, after "wall" insert --,--.

Signed and Sealed this
Thirty-first Day of May, 2011

David J. Kappos
*Director of the United States Patent and Trademark Office*